Nov. 25, 1930.  W. J. BRENNEN  1,782,458

MOTOR PROTECTIVE DEVICE

Filed Feb. 13, 1928

WITNESSES
A B Wallace.
Fulton B. Flick

INVENTOR
William J. Brennen
by Brown Critchlow
his attorneys.

Patented Nov. 25, 1930

1,782,458

UNITED STATES PATENT OFFICE

WILLIAM J. BRENNEN, OF SCOTTDALE, PENNSYLVANIA

MOTOR PROTECTIVE DEVICE

Application filed February 13, 1928. Serial No. 253,837.

The invention relates to protective devices for electrical apparatus, and especially to means for preventing overheating and burning out of electric motors.

An object of the invention is to provide means associated with the field element of a motor for opening the motor circuit when the temperature of the field element becomes dangerously high, thereby preventing overheating and damage to the motor.

Other objects of the invention are to provide a thermo-responsive device in contact with all parts of the field element or stator coils of a motor; to provide circuit control mechanism associated with and actuated by the device at a predetermined temperature and which is adjustable to be effective at any desired temperature; and to provide motor protective apparatus adapted to respond to abnormal temperature rise in any part or all of the element to be protected, which is certain and efficient in operation, simple in construction, requires substantially no attention, can be readily installed on a motor, and which is adapted to re-establish the circuit when the temperature of the coils has again fallen to normal values.

Figure 1:
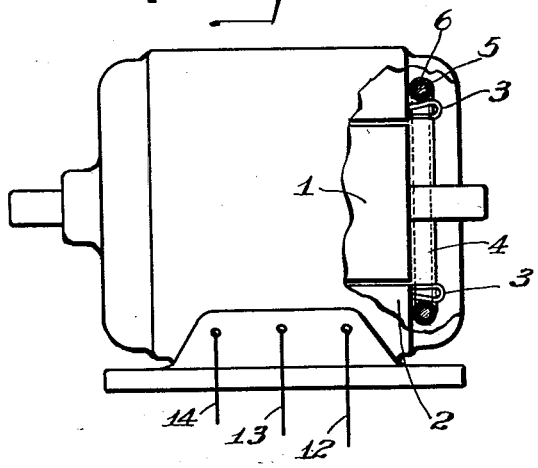
Figure 2:
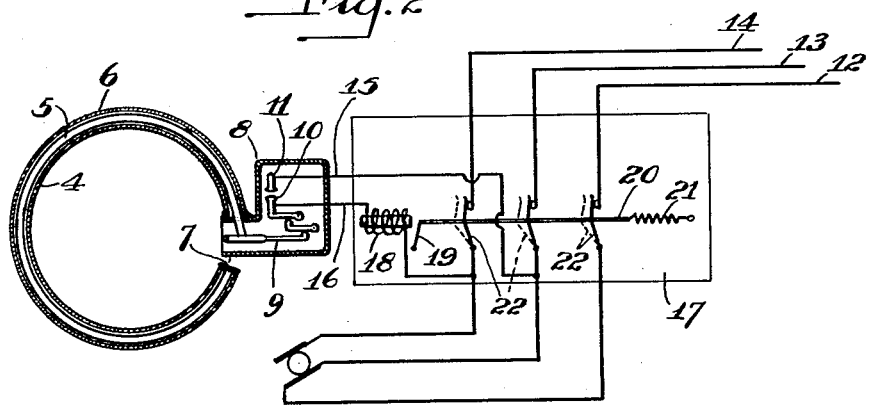

The invention is illustrated in the accompanying drawings. Fig. 1 is a side elevation partly in section of a motor equipped in accordance with the invention; Fig. 2 a front view of the thermo-responsive device as it would appear in position, together with suitable circuit control mechanism; and Fig. 3 a modified form of thermo-responsive element.

The invention is equally applicable to both direct and alternating current machines, both of which have a revolving element and a stationary field element, and it comprises disposing a thermo-responsive device peripherally about one of said elements so as to be in contact therewith, and this device in response to heating of the element operates associated circuit control mechanism when the temperature reaches a definite predetermined value.

Referring to the illustrative embodiment of Fig. 1, which shows the application of the invention to one type of motor, there is shown a motor provided with a rotor 1 and stator coils 2, the construction of which are well understood and form no part of this invention, and so need not be described in detail. In accordance with the invention, a thermo-responsive element is disposed about the stator coils, preferably in contact with each of the coils. The motor illustrated is of a common alternating current type, in which the ends of the coils terminate in loops 3 which project somewhat beyond the ends of the stator. In this case the thermo-responsive element, indicated generally by the numeral 4, is preferably disposed about this loop, so as to be in intimate contact with all of the stator coils. The front view of the device in place, looking at the end of the motor, is substantially that shown in Fig. 2.

A variety of thermo-responsive elements are available for this purpose, whose action in general depends upon expansion induced by heat. For the purposes of the invention, a thermo-responsive device of the type comprising two metals having widely different coefficients of linear expansion is preferred, in which the one having the higher coefficient responds to heating and the other is actuated thereby to operate associated mechanism. The form illustrated comprises a core 5 of a metal having a very low coefficient of linear expansion such as invar steel, enclosed within a casing 6 of a metal which possesses a high linear coefficient of expansion, such as copper, the coefficients per degree centigrade of the metals named, being approximately 0.000001 and 0.000017, respectively. Preferably the core fits snugly within the casing, the clearance being insufficient to permit buckling of the core; and the two metals are welded or otherwise connected together at one end, as indicated at 7, Fig. 2.

The heat-sensitive device constructed as above is placed around and in contact with the stator coils of the motor, the end 7 remaining free, and the opposite end being connected to a circuit-operating apparatus, a suitable form of which is shown in Fig. 2. Assuming the device to be used with a motor having cotton insulated coils, it will usually be desirable to have it operative at about 95°

C., which corresponds to a temperature rise of about 40° C. The expansion corresponding to this temperature interval will be quite small, and for this reason it is desirable to magnify the expansion effect. To this end the circuit-operating apparatus comprises a box 8, securely carried by the motor frame, to which casing 6 is fastened, as by welding. Core 5 extends into the box, where it is connected to a pivoted lever 9 which forms a part of a magnifying motion mechanism for operating a movable contact member 10 to and from a fixed contact 11. The motor shown receives power through electrical conductors 12, 13 and 14, and the contacts 10 and 11 are connected to one pair of these wires by conductors 15 and 16. At some suitable point, such as a control panel 17, an electromagnet 18 is interposed in the circuit 15—16, which actuates a pivoted armature 19. A switch bar 20 connected at one end to the armature and at the other to a coil spring 21 carries switch members 22 which are suitably insulated from the bar. The pull of the electromagnet and the tension of the spring are proportioned so that the former will be capable of opening the switches against the spring tension.

When a motor equipped according to the invention is in operation, an increase in temperature of the parts with which it is in contact will cause the thermo-responsive element to expand, and since the tube member of this element has a larger linear coefficient of expansion, while the coefficient of the core is small, expansion of the tube will result in movement of the core in the same direction, and this movement will be transmitted through the increased motion mechanism to the movable contact. When installed, the distance separating the fixed and movable contacts is made such that when the temperature of the coils reaches a dangerous point the resultant expansion will have moved contact 10 sufficiently to close the circuit 15—16. As soon as this happens, the electromagnet is energized, and armature 19 is moved toward the electromagnet, carrying with it the switch bar and opening the motor circuit switches 22. The position of the switches when in this condition is indicated in dotted lines in Fig. 2. Thus as soon as the coil temperature becomes such as to endanger the motor, the switches will be opened and the motor power supply will be cut off. As the coils cool, the thermo-responsive element will contract, and when the motor has again reached a safe operating temperature, the movable contact 10 will be withdrawn from contact 11, opening circuit 15—16 and de-energizing the electromagnet, when spring 21 will draw the switch bar away from the magnet and close the motor switches. Numerous starting or control devices are well known in the art, any suitable form of which may be used in place of the simple illustrative device shown.

Any suitable means may be employed for adjusting the distance between the contact members to vary the temperature at which the expansion will cut off the motor power supply, and the contactors can be arranged for circuit-opening, or closing, as may be necessary or desirable.

Figure 3:
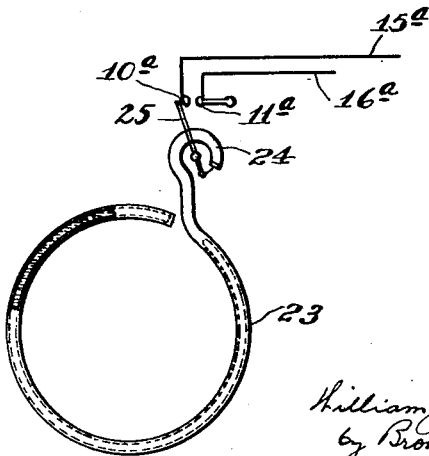

A modification of the heat-sensitive device is shown in Fig. 3. This comprises a fluid pressure element, such as a tube filled with a liquid or a gas the coefficients of expansion of which is suitably adapted for this purpose. In the use of this modification, the element is fixed in place on the ends of the stator coils, as before, and the free end 24 of the element is connected through a diaphragm or other pressure transmitting means to a lever 25 which actuates the movable contact $10^a$ to and from a fixed contact $11^a$, of a circuit $15^a$—$16^a$, which are connected and operate in a manner similar to that described for the preceding embodiment. This form of thermo-responsive device and its pressure-translating mechanism are well known and therefore require no extended description here.

The invention is not limited to its application to alternating current motors, or to the particular construction shown. It is equally applicable to and effective with direct current motors, and its application thereto will be readily understood by those skilled in the art. In alternating current machines the stationary element is generally called the stator, and the rotating element the rotor, while with direct current machines these elements are generally referred to as the field element and armature respectively. To the extent that the stator and field element are stationary and the rotor and armature revolve, they are similar, and in the appended claims the terms rotor and stator equally comprehend both applications of those elements.

The invention thus provides a means of protecting electrical apparatus, such as motors, by preventing burning out of the coils as a result of overheating. Various important advantages have been pointed out. In addition, it is especially efficient because the heat-sensitive device is in intimate contact with all of the coils, whereby it becomes effective for its stated purpose not only when the temperature of all the coils becomes excessive, but also when any part of them overheat for any reason whatever. It affords good protection also against damage to polyphase motors as a result of phase failure.

According to the provisions of the patent statutes, I have explained the principle and operation of my invention, and have illustrated and described what I now consider to be its best embodiment. However, I desire to have it understood that, within the scope of the appended claims, the invention may be practiced otherwise than as specifically illustrated and described.

I claim:

1. In combination with an electric motor, an elongate thermostat arranged inside and extended about the periphery of the motor, and a movable member operably coupled to said thermostat for movement in response to the temperature conditions prevailing at the various points about the motor.

2. In combination with an electric motor having a wound stator, a thermostat comprising an elongate thermo-responsive element of curved shape arranged within the motor adjacent to and in circumscribing relation about the periphery of the stator windings whereby rendering the thermostat responsive to the internal temperature of the motor at all points surrounding said windings.

3. In combination with an electric motor, a thermostatic switch for automatically opening an electric circuit in response to a predetermined temperature in the motor, said switch comprising an elongate curved tube having a relatively high coefficient of expansion arranged in circumscribing relation about the inside of the motor, one end of said tube being fixed and the other free, an elongate rod having a relatively low coefficient of expansion disposed within said tube with its inner end connected to the free end of the tube and arranged for relative movement therein, a movable contact member operably coupled to said rod, and a fixed contact member arranged to cooperate with said movable contact member.

4. In combination with an electric motor having a wound stator, an elongate thermo-responsive device arranged inside the motor in circumscribing relation about one end of said stator windings, said device comprising two elongate metallic elements having widely different coefficients of linear expansion, one of said elements being mounted with one end free and the other fixed, the other of said elements being connected at one end to the free end of the first-mentioned element and arranged for movement relative thereto, and circuit controlling means operably coupled to the free end of the last-mentioned thermo-responsive element whereby rendering the circuit controlling mechanism responsive to the temperature conditions prevailing in the motor at various points about the stator windings.

In testimony whereof, I sign my name.

WILLIAM J. BRENNEN.